United States Patent [19]

Watanabe et al.

[11] 4,369,170
[45] Jan. 18, 1983

[54] INTERCALATION COMPOUND OF A GRAPHITE WITH A THIAZYL SALT, A PROCESS FOR PRODUCING THE SAME, AND AN ELECTRICALLY CONDUCTIVE MATERIAL COMPRISING THE INTERCALATION COMPOUND OF A GRAPHITE WITH A THIAZYL SALT

[75] Inventors: Nobuatsu Watanabe, Nagaokakyo; Tsuyoshi Nakajima, Kyoto; Masayuki Kawaguchi, Arida, all of Japan

[73] Assignee: Central Glass Co., Ltd., Ube, Japan

[21] Appl. No.: 313,672

[22] Filed: Oct. 21, 1981

[30] Foreign Application Priority Data

May 1, 1981 [JP] Japan .................................. 56-65172

[51] Int. Cl.$^3$ .................................................. C01C 3/20
[52] U.S. Cl. .................................... 423/366; 252/502; 252/506
[58] Field of Search ................. 423/366; 252/502, 506

[56] References Cited

PUBLICATIONS

T. E. Thompson, E. R. Falardeau and L. R. Hanlon, *Carbon*, vol. 15, pp. 39–43, (1977).

*Primary Examiner*—Earl C. Thomas
*Assistant Examiner*—Wayne A. Langel
*Attorney, Agent, or Firm*—Armstrong, Nikaido, Marmelstein & Kubovcik

[57] ABSTRACT

A novel intercalation compound of a graphite with a thiazyl salt represented by the formula $Z.S_4N_4.2SbCl_5$ wherein Z stands for $C_{24}$, pyrolytic carbon or pyrolytic graphite is prepared by reacting a graphite material with trithiazyl trichloride and antimony trichloride in the presence of a non-polar solvent. The graphite intercalation compound thus obtained has not only an excellent stability to humidity or moisture but also a high electrical conductivity. The novel intercalation compound according to the present invention may be practically used as a novel electrically conductive material and a catalyst of organic reactions.

12 Claims, 4 Drawing Figures

X-RAY DIFFRACTION PATTERN OF $C_{24}S_4N_4 \cdot 2SbCl_5$
(GRAPHITE + $S_3N_3Cl_3$ + $3SbCl_3$ IN $CCl_4$ AT 55°C FOR 12 DAYS)

X-RAY DIFFRACTION PATTERN OF $C_{24}S_4N_4 \cdot 2SbCl_5$
(GRAPHITE + $S_3N_3Cl_3$ + $3SbCl_3$ IN $CCl_4$ AT 55°C FOR 12 DAYS)

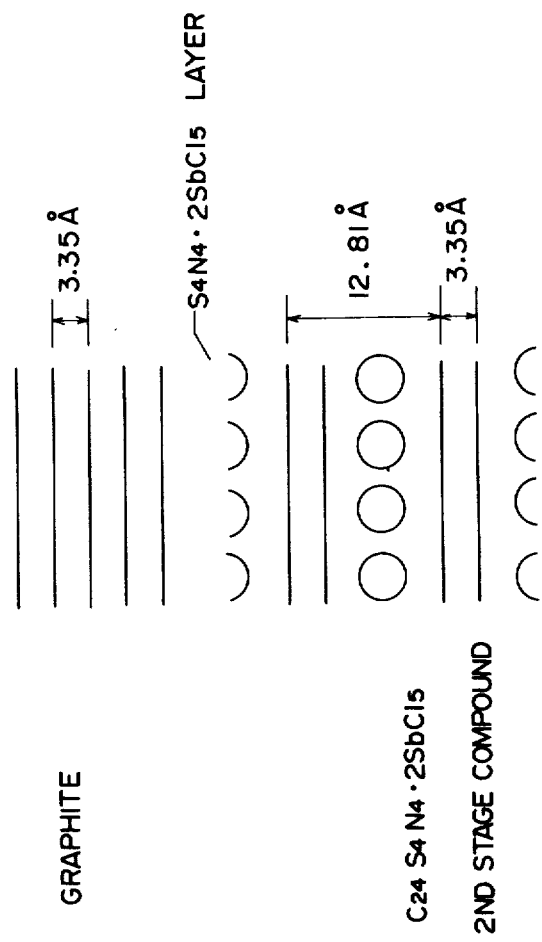

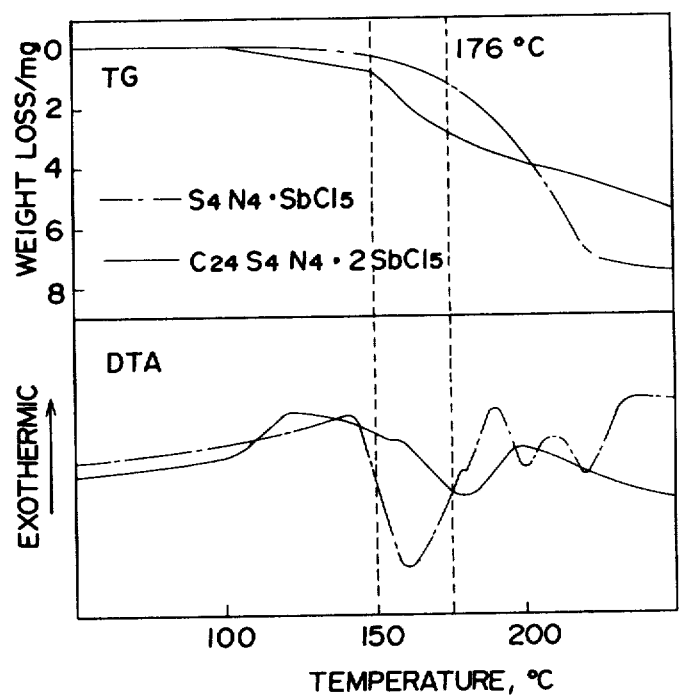

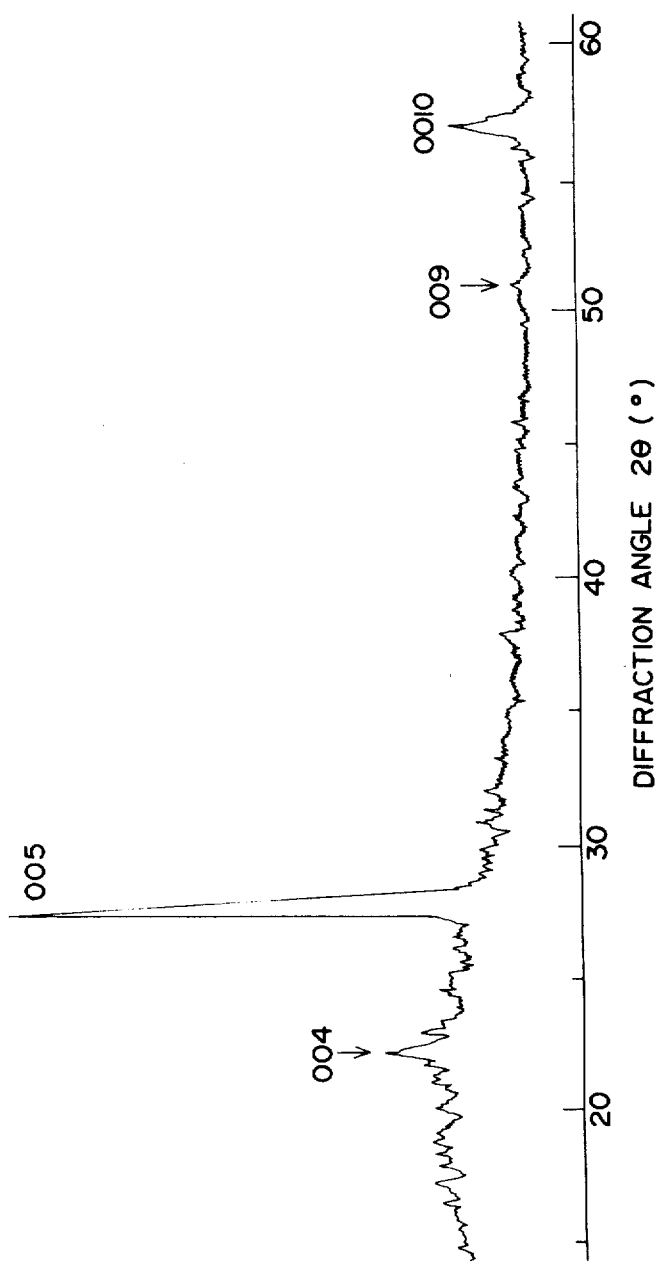

INTERCALATION COMPOUND OF A GRAPHITE WITH A THIAZYL SALT, A PROCESS FOR PRODUCING THE SAME, AND AN ELECTRICALLY CONDUCTIVE MATERIAL COMPRISING THE INTERCALATION COMPOUND OF A GRAPHITE WITH A THIAZYL SALT

This invention relates to an intercalation compound of a graphite with a thiazyl salt. More particularly, the present invention is concerned with a novel intercalation compound of a graphite with a thiazyl salt which is not only stable to humidity or moisture but also has an excellent electrical conductivity. The present invention is also concerned with a process for producing an intercalation compound of a graphite with a thiazyl salt. The present invention is further concerned with an electrically conductive material comprising the thus prepared intercalation compound of a graphite with a thiazyl salt.

In recent years, there have been proposed various graphite intercalation compounds having a high electrical conductivity and attention has been given to the graphite intercalation compounds as novel electrically conductive materials.

With respect to substances which are intercalated into a graphite material to form graphite intercalation compounds therewith, there are known an alkali metal, a halogen, a metal halide and the like. However, all conventionally known graphite intercalation compounds are extremely instable to humidity or moisture, so that they decompose immediately upon exposure to the air. Heretofore, there have been found no graphite intercalation compounds which can be successfully used as an electrically conductive material in practical applications.

With a view to developing a practically applicable graphite intercalation compound having an excellent electrical conductivity and an excellent stability to humidity or moisture, and which is able to be practically used as an electrically conductive material, the present inventors have made extensive and intensive investigations. As a result, the present inventors have found a reaction represented by the reaction formula $S_3N_3Cl_3 + 3SbCl_3 \rightarrow S_4N_4SbCl_5$ (reddish brown color). Further, the present inventors have unexpectedly found that when the above-mentioned reaction is conducted together with a graphite material, there can be obtained a novel thiazyl salt-intercalated intercalation compound of a graphite, which intercalation compound has not only an excellent stability to humidity or moisture but also an excellent electrical conductivity. The present invention has been made based on such novel findings.

Accordingly, it is an object of the present invention to provide a novel thiazyl salt-graphite intercalation compound which is stable to humidity or moisture and has an excellent electrical conductivity.

It is another object of the present invention to provide a process for the preparation of such a novel thiazyl salt-graphite intercalation compound.

It is a further object of the present invention to provide a novel electrically conductive material comprising a novel thiazyl salt-graphite intercalation compound of the kind described above.

The foregoing and other objects, features and advantages of the present invention will be apparent to those skilled in the art from the following detailed description taken in connection with the accompanying drawings in which:

FIG. 2 shows a structural model diagram of $C_{24}.S_4N_4.2SbCl_5$ in comparison with that of a graphite;

Figure 1:
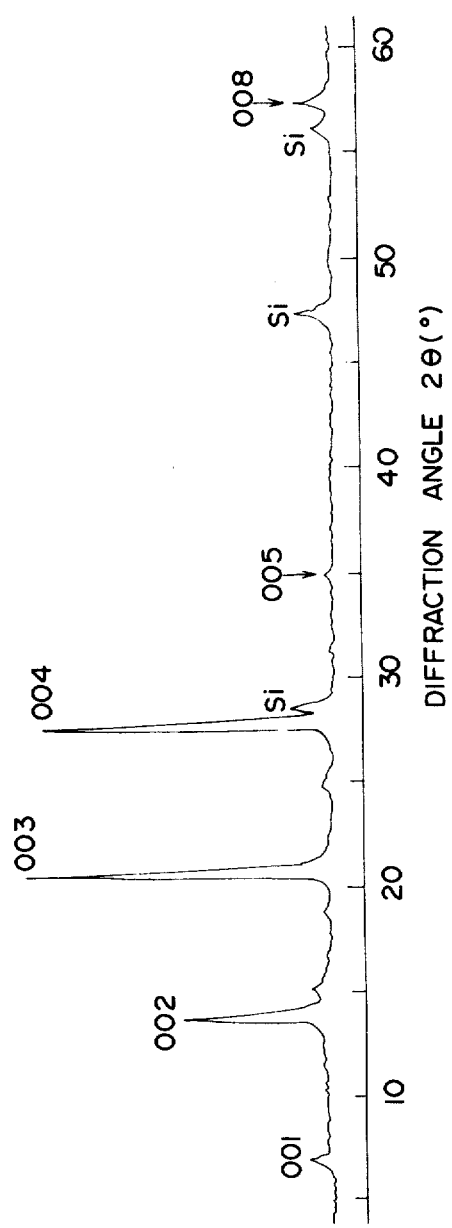
FIG. 1 is an X-ray diffraction pattern of $C_{24}.S_4N_4.2SbCl_5$(2nd stage intercalation compound) which is one of the intercalation compounds according to the present invention.

FIG. 3 shows DTA (differential thermal analysis) and TG (thermogravimetry) curves of $C_{24}.S_4N_4.2SbCl_5$ in comparison with those of $S_4N_4.2SbCl_5$; and FIG. 4 is an X-ray diffraction pattern of $PC.S_4N_4.2SbCl_5$ (3rd stage intercalation compound) which is another one of the intercalation compounds according to the present invention. In accordance with one aspect of the present invention, there is provided a novel intercalation compound of a graphite with a thiazyl salt represented by the formula $Z.S_4N_4.2SbCl_5$ wherein Z stands for $C_{24}$, pyrolytic carbon or pyrolytic graphite.

In accordance with another aspect of the present invention, there is provided a process for producing a novel graphite intercalation compound of the kind described above, which comprises reacting a graphite material with trithiazyl trichloride of the formula $S_3N_3Cl_3$ and antimony trichloride of the formula $SbCl_3$ in the presence of a non-polar solvent at about 30° to 70° C.

In accordance with still another aspect of the present invention, there is provided a novel electrically conductive material comprising an intercalation compound of a graphite with a thiazyl salt.

The present invention will now be described in detail.

A graphite material to be employed for the production of $C_{24}.S_4N_4.2SbCl_5$ according to the present invention may be any of a natural graphite and an artificial graphite which can be obtained by subjecting petroleum coke or the like to heat treatment. The size of a graphite material to be employed is not critical. There may be employed flaky graphite or powdery graphite having a size of 20 to 50 meshes or not less than 50 to 400 meshes or more (Tyler). Meanwhile, in case a block-shaped product is required, there may be used a material which can be obtained by a process which comprises contacting a hydrocarbon such as methane, propane, benzene and/or acetylene with a substrate (generally, made of an artificial graphite) heated at approximately 2,100° C. to pyrolyze the hydrocarbon and to deposit the resulting graphite material on the substrate, and further subjecting the deposited graphitic material to final heat treatment. In this case, block graphites having different graphitization degree are obtained according to the final heat-treatment temperature. When the final heat treatment is effected at about 2400° C., there is obtained a pyrolytic carbon (hereinafter referred to as "PC"). When the heat treatment is effected at about 2,600° to 3,000° C., there is obtained a pyrolytic graphite (hereinafter referred to as "PG"). As will be described later, a 3rd stage intercalation compound is formed when a block graphite thus prepared is used as a graphite material in the reaction, whereas a 2nd stage intercalation compound is formed when a flaky or powdery graphite is used as a graphite material in the reaction.

The stage number of an intercalation compound obtained is determined by the measurements of the repeat distance obtained by X-ray diffraction and the size of intercalated substance. The chemical formula of an intercalation compound is determined by elementary analysis.

The reaction for preparing a thiazyl salt-graphite intercalation compound according to the present invention is represented by the following reaction formula:

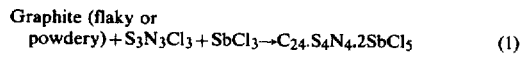

(1)

or

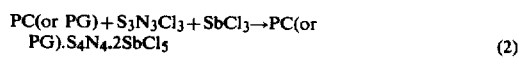

(2)

The reaction should be carried out in the presence of a non-polar solvent. Examples of the non-polar solvent to be employed include $CCl_4$, $CH_2Cl_2$ and $CH_3CN$. Of them, $CCl_4$ and $CH_2Cl_2$ are especially preferred.

The above-mentioned non-polar solvent may be used in an amount of about 10 to 200 ml per gram of a graphite material, preferably 40 to 60 ml per gram of a graphite material.

Trithiazyl trichloride ($S_3N_3Cl_3$) may be employed in an amount of about 0.8 to 1.3 grams per gram of a graphite material, preferably about 1.0 gram per gram of a graphite material. When too large an amount of trithiazyl trichloride is employed, trithiazyl trichloride remains unreacted in the solvent after completion of the reaction. Such unreacted trithiazyl trichloride is reacted with antimony trichloride to form $S_4N_4.2SbCl_5$ and, in turn, there is formed a mixture of the desired intercalation compound and $S_4N_4.2SbCl_5$, leading to difficulties in separation of the intercalation compound therefrom.

Antimony trichloride ($SbCl_3$) may be employed in an amount of 2.5 to 3.5 mols per mol of a graphite material, preferably about 3.0 mols per mol of a graphite material. After completion of the reaction, the separation between the intercalation compound and $SbCl_3$ can be easily achieved.

The reaction may be carried out at temperatures in the range of about 30° to 70° C., and the reaction may preferably be carried out at about 50° to 55° C.

The reaction time may vary depending on the reaction temperature, but is generally about 3 to 20 days, preferably 7 to 10 days. After completion of the reaction, the resulting product is separated by filtration and then dried to remove the solvent in the product by means of a rotary pump. There is obtained an intended intercalation compound in a yield of about 90 to 100% based on $S_3N_3Cl_3$.

When a flaky or powdery graphite is employed as a raw graphite material, there may be obtained a 2nd stage intercalation compound, $C_{24}.S_4N_4.2SbCl_5$ (reddish brown color). When a block graphite, PG or PC, is used as a raw graphite material, there may be obtained a 3rd stage intercalation compound, $PG.S_4N_4.2SbCl_5$ or $PC.S_4N_4.2SbCl_5$.

In FIG. 1, there is shown an X-ray diffraction pattern ($CuK_\alpha$) of the intercalation compound $C_{24}.S_4N_4.2SbCl_5$ prepared by reacting a flaky graphite with $S_3N_3Cl_3 + 3SbCl_3$ in $CCl_4$ at 55° C. for 12 days. As is apparent from FIG. 1, the repeat distance Ic of this compound is 12.81±0.02 Å. The structural model diagrams of $C_{24}.S_4N_4.2SbCl_5$ (2nd stage compound) and graphite are shown in FIG. 2. As is apparent from FIG. 2, $S_4N_4.2SbCl_5$ is intercalated into alternate layers of the graphite.

FIG. 3 shows TG and DTA curves (heating rate: 10° C./min) of $C_{24}.S_4N_4.2SbCl_5$ produced according to the present invention in comparison with those of $S_4N_4.SbCl_5$ which has been prepared by the reaction of $S_3N_3Cl_3$ with $3SbCl_3$. $S_4N_4SbCl_5$ and $C_{24}.S_4N_4.2SbCl_5$ begin to decompose at substantially the same temperature, that is, at approximately 150° C.

In FIG. 4, there is shown an X-ray diffraction pattern ($CuK_\alpha$) of an intercalation compound $PC.S_4N_4.2SbCl_5$ (3rd stage compound) prepared by the reaction of pyrolytic carbon (PC) with $S_3N_3Cl_3 + 3SbCl_3$ in $CCl_4$ at 55° C. for 12 days. As is apparent from FIG. 4, the repeat distance Ic of this compound is 16.11±0.05 Å. $PG.S_4N_4.2SbCl_5$ also have substantially the same repeat distance as that of $PC.S_4N_4.2SbCl_5$.

Even after the graphite intercalation compound according to the present invention is exposed to the air for several weeks, the analysis of the exposed compound by means of X-ray diffractometry exhibits substantially the same X-ray diffraction pattern as that of the unexposed compound. That is to say, the graphite intercalation compound according to the present invention is stable to humidity or moisture as different from the conventionally known graphite intercalation compounds which decompose immediately when they are exposed to the air.

Next, an explanation will be given on the electrical conductivities in the direction of a-axis (parallel to graphite layers) of the thiazyl salt-intercalated intercalation compounds of graphite according to the present invention, i.e., $C_{24}.S_4N_4.2SbCl_5$ (2nd stage compound), and $PC.S_4N_4.2SbCl_5$ and $PG.S_4N_4.2SbCl_5$ (3rd stage compounds). It is generally known to those skilled in the art that there is substantially no difference in electrical conductivity between a 2nd stage compound and a 3rd stage compound (see SYNTHETIC METALS, Vol. 1, No. 3, pages 280 to 283, 294 to 298, April, 1980). For this reason, as a typical intercalation compound according to the present invention, $PC.S_4N_4.2SbCl_5$ was employed for the measurement of electrical conductivity from the standpoint of easiness of preparing a test sample. A-axis electrical conductivites were measured of pyrolytic carbon and $PC.S_4N_4.2SbCl_5$ according to the 4-point DC-bridge method as described in "Materials Science and Engineering, 31 (1977) 255–259."

The results are shown in Table 1.

TABLE 1

| Electrical conductivities of PC and $PC.S_4N_4.2SbCl_5$ at 25° C. | |
|---|---|
| Compound | $\Omega^{-1} cm^{-1}$ |
| PC | $3.9 \times 10^3$ |
| $PC.S_4N_4.2SbCl_5$ | $4.4 \times 10^4$ |

As shown in Table 1, the electrical conductivity of $PC.S_4N_4.2SbCl_5$ according to the present invention is higher than that of the original PC by one cipher. Among graphite intercalation compounds other than those according to the present invention, $PG.SbCl_5$ (3rd stage compound) also has an electrical conductivity as high as $4.1 \times 10^4 \Omega^{-1} cm^{-1}$. However, this compound is hygroscopic and instable, so that it decomposes immediately when it is exposed to the air. By contrast, as mentioned above, the intercalation compound of a graphite with a thiazyl salt according to the present invention has an excellent stability to humidity or moisture but also a high electrical conductivity. The thiazyl salt-intercalated intercalation compound of a graphite according to the present invention can be sheathed by a copper foil or incorporated into an epoxy resin so that it can be used as an electrically conductive material. The graphite intercalation compound according to the present invention is the first graphite intercalation compound that can be practically used as an electrically conductive material, indeed. As mentioned above, according to the present invention, there is provided a novel electrically conductive material comprising an intercalation compound of a graphite with a thiazyl salt represented by the formula $Z.S_4N_4.2SbCl_5$ wherein Z stands for $C_{24}$, PC or PG. The graphite intercalation compound according to the present invention is useful not only as an electrically conductive material but also as a catalyst for various organic reactions.

The present invention will be illustrated in more detail with reference to the following Examples, which should not be construed to be limiting the scope of the present invention.

EXAMPLE 1

In a 100 ml two-necked flask equipped with a stop cock was charged 60 ml of $CCl_4$, 1.416 g of flaky natural graphite (about 3 mm$^2$) from Madagascar ore, 1.589 g of $S_3N_3Cl_3$ and 4.433 g of $SbCl_3$ were then added. The reaction was carried out at 55° C. for 12 days with stirring. The reaction mixture was cooled to room temperature and then filtered. The resulting product was dried to remove the solvent by means of a rotary pump. There was obtained the intended reddish brown product, $C_{24}.S_4N_4.2SbCl_5$, which was stable to humidity.

Elementary Analysis: Calculated: C, 26.9%; S, 12.0%; N, 5.2%; Cl, 33.1%; Sb, 22.8%. Found: C, 26.6%; S, 10.8%; N, 4.8%; Cl, 32.4%; Sb, 21.5%.

The graphite intercalation compound thus prepared was analyzed by X-ray diffractometry. An X-ray diffraction pattern as shown in FIG. 1 was given and the repeat distance of this compound was 12.81±0.02 Å.

EXAMPLE 2

Substantially the same procedures as in Example 1 were repeated except that 1.100 g of powdery graphite (not less than 400 meshes), 1.262 g of $S_3N_3Cl_3$ and 3.523 g of $SbCl_3$ were used instead of flaky graphite from Madagascar ore, 1.589 g of $S_3N_3Cl_3$ and 4.433 g of $SbCl_3$, and that the reaction was carried out for 8 days instead of 12 days.

There was obtained the intended product $C_{24}.S_4N_4.2SbCl_5$.

Elementary Analysis: Found: C, 26.9%; S, 11.4%; N, 5.2% Cl, 31.5%; Sb, 22.6%.

EXAMPLE 3

Substantially the same procedures as in Example 1 were repeated except that 1.010 g of powdery graphite (not less than 400 meshes), 1.105 g of $S_3N_3Cl_3$, 3.085 g of $SbCl_3$ and 50 ml of $CCl_4$ were used instead of flaky graphite from Madagascar ore, 1.589 g of $S_3N_3Cl_3$, 4.433 g of $SbCl_3$ and 60 ml of $CCl_4$, and that the reaction was carried out at room temperature for 10 days instead of at 55° C. for 12 days. There was obtained the intended product $C_{24}.S_4N_4.2SbCl_5$.

Elementary Analysis Found: C, 27.3%; S, 10.2%; N, 5.2%; Cl, 31.3%; Sb, 21.3%.

EXAMPLES 4 TO 7

Substantially the same procedures as in Example 1 were repeated under conditions as indicated in Table 2. There was obtained the intended product $C_{24}.S_4N_4.2SbCl_5$ in good yield.

TABLE 2

| | | Example No. | | | |
|---|---|---|---|---|---|
| | | 4 | 5 | 6 | 7 |
| | | Conditions | | | |
| | Appearance | Flake | Powder (not less than 400 meshes) | Powder (not less than 400 meshes) | Powder (not less than 400 meshes) |
| Graphite | g | 1.234 | 0.816 | 1.289 | 1.003 |
| $S_3N_3Cl_3$ | g | 1.056 | 0.652 | 1.477 | 0.967 |
| $SbCl_3$ | g | 2.948 | 1.820 | 4.124 | 2.700 |
| Solvent | Kind | $CCl_4$ | $CCl_4$ | $CCl_4$ | $CH_2Cl_2$ |
| | ml | 60 | 50 | 60 | 50 |
| React. Temp. | °C. | 55 | Room temp. | 40 | Room temp. |
| React. Time | Days | 8 | 12 | 9 | 10 |

EXAMPLE 8

Substantially the same procedures as in Example 1 were repeated except that pyrolytic carbon (PC) was used instead of flaky natural graphite. There was obtained the desired product $PC.S_4N_4.2SbCl_5$.

The graphite intercalation compound thus prepared was analyzed by X-ray diffractometry. An X-ray diffraction pattern as shown in FIG. 4 was given and the repeat distance of this compound was 16.11±0.05 Å.

What is claimed is:

1. An intercalation compound of a graphite with a thiazyl salt represented by the formula $Z.S_4N_4.2SbCl_5$ wherein Z stands for $C_{24}$, pyrolytic carbon or pyrolytic graphite.

2. A process for producing an intercalation compound of a graphite with a thiazyl salt which comprises reacting a graphite material with trithiazyl trichloride and antimony trichloride in the presence of a non-polar solvent.

3. A process according to claim 2, wherein said graphite material is flaky or powdery graphite.

4. A process according to claim 2, wherein said graphite material is pyrolytic carbon.

5. A process according to claim 2, wherein said graphite material is pyrolytic graphite.

6. A process according to claim 2, wherein said non-polar solvent is $CCl_4$, $CH_2Cl_2$ or $CH_3CN$.

7. A process according to claim 2, wherein said non-polar solvent is employed in an amount of 10 to 200 ml per gram of the graphite material.

8. A process according to claim 2, wherein said trithiazyl trichloride is employed in an amount of 0.8 to 1.3 grams per gram of the graphite material.

9. A process according to claim 2, wherein said antimony trichloride is employed in an amount of 2.5 to 3.5 mols per mol of the trithiazyl trichloride.

10. A process according to claim 2, wherein the reaction is conducted at a temperature of about 30° to 70° C.

11. A process according to claim 2, wherein the reaction is conducted for about 3 to 20 days.

12. An electrically conductive material comprising an intercalation compound of a graphite with a thiazyl salt represented by the formula $Z.S_4N_4.2SbCl_5$ wherein Z stands for $C_{24}$, pyrolytic carbon or pyrolytic graphite.

* * * * *